(12) United States Patent
Matsuo et al.

(10) Patent No.: US 10,800,189 B2
(45) Date of Patent: Oct. 13, 2020

(54) PRINTING APPARATUS WITH PLATEN MOVEABLE FOR JAM PROCESSING

(71) Applicant: CANON KABUSHIKI KAISHA, Tokyo (JP)

(72) Inventors: Kazuki Matsuo, Kawasaki (JP); Seiji Ogasawara, Machida (JP); Takaaki Ishida, Kawasaki (JP); Shuichi Tokuda, Kawasaki (JP); Masakazu Tsukuda, Yokohama (JP); Masaaki Matsuura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/220,829

(22) Filed: Dec. 14, 2018

(65) Prior Publication Data

US 2019/0184718 A1 Jun. 20, 2019

(30) Foreign Application Priority Data

Dec. 20, 2017 (JP) ................. 2017-244268

(51) Int. Cl.
*B41J 11/00* (2006.01)
*B41J 11/04* (2006.01)
*B41J 11/14* (2006.01)
*H04N 1/00* (2006.01)
*B41J 11/02* (2006.01)

(52) U.S. Cl.
CPC .............. *B41J 11/006* (2013.01); *B41J 11/02* (2013.01); *B41J 11/04* (2013.01); *B41J 11/14* (2013.01); *H04N 1/00543* (2013.01)

(58) Field of Classification Search
CPC . B41J 11/006; B41J 11/04; B41J 11/14; B41J 11/02; H04N 1/00543
See application file for complete search history.

(56) References Cited

U.S. PATENT DOCUMENTS

| 8,696,107 B2 | 4/2014 | Lo et al. | |
| 2013/0050372 A1* | 2/2013 | Lo | B41J 11/006 347/104 |
| 2016/0059588 A1* | 3/2016 | Aizawa | B41J 2/32 347/220 |

FOREIGN PATENT DOCUMENTS

JP 2015-066934 A 4/2015

* cited by examiner

*Primary Examiner* — Bradley W Thies
(74) *Attorney, Agent, or Firm* — Venable LLP

(57) ABSTRACT

A printing apparatus capable of performing jam processing includes a movable platen. For this purpose, once support of a platen supporting member is released, the platen will automatically turn to a predetermined angle.

9 Claims, 11 Drawing Sheets

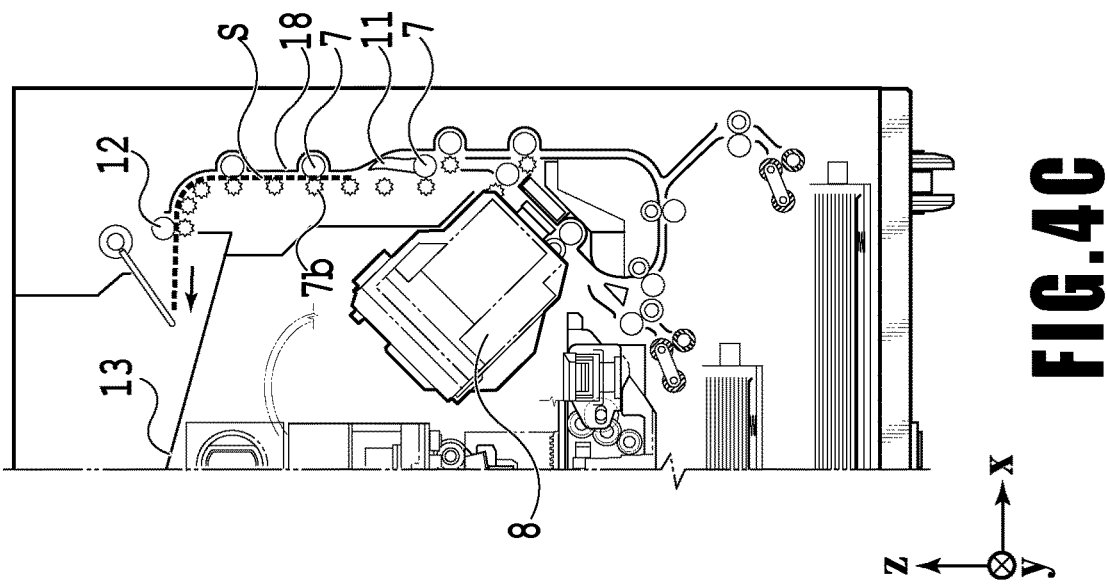
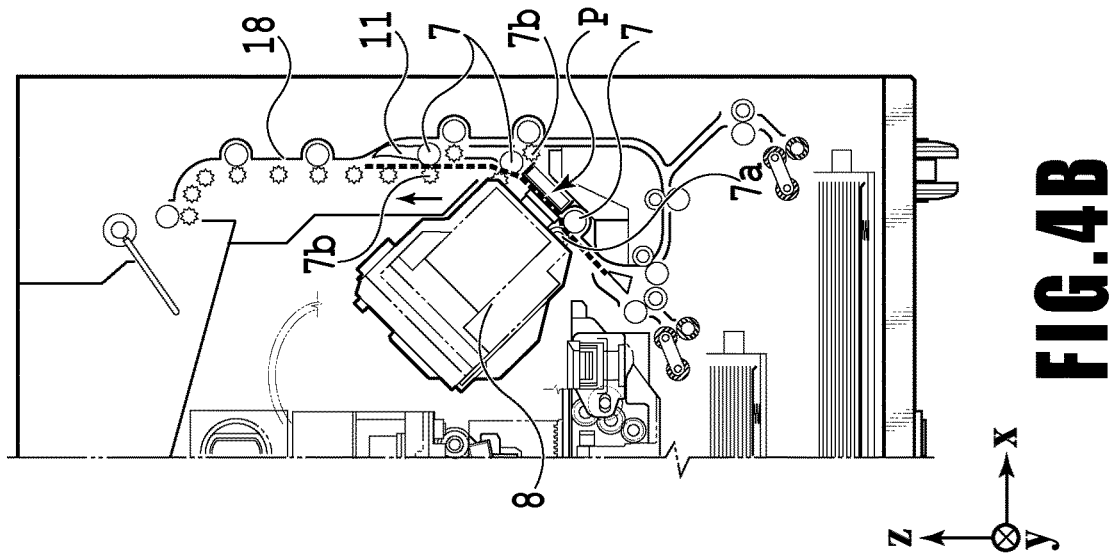
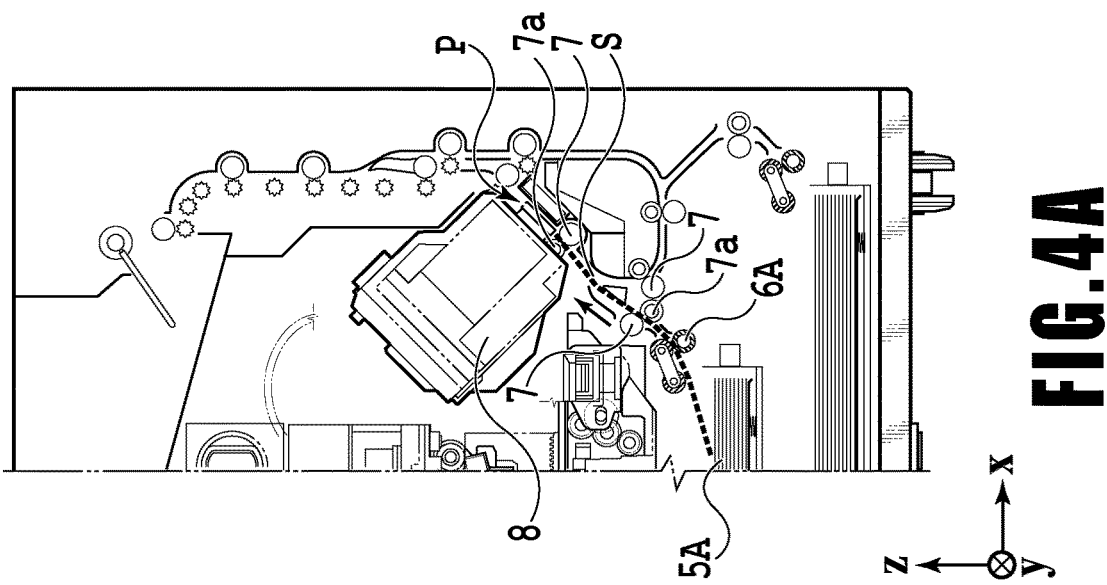

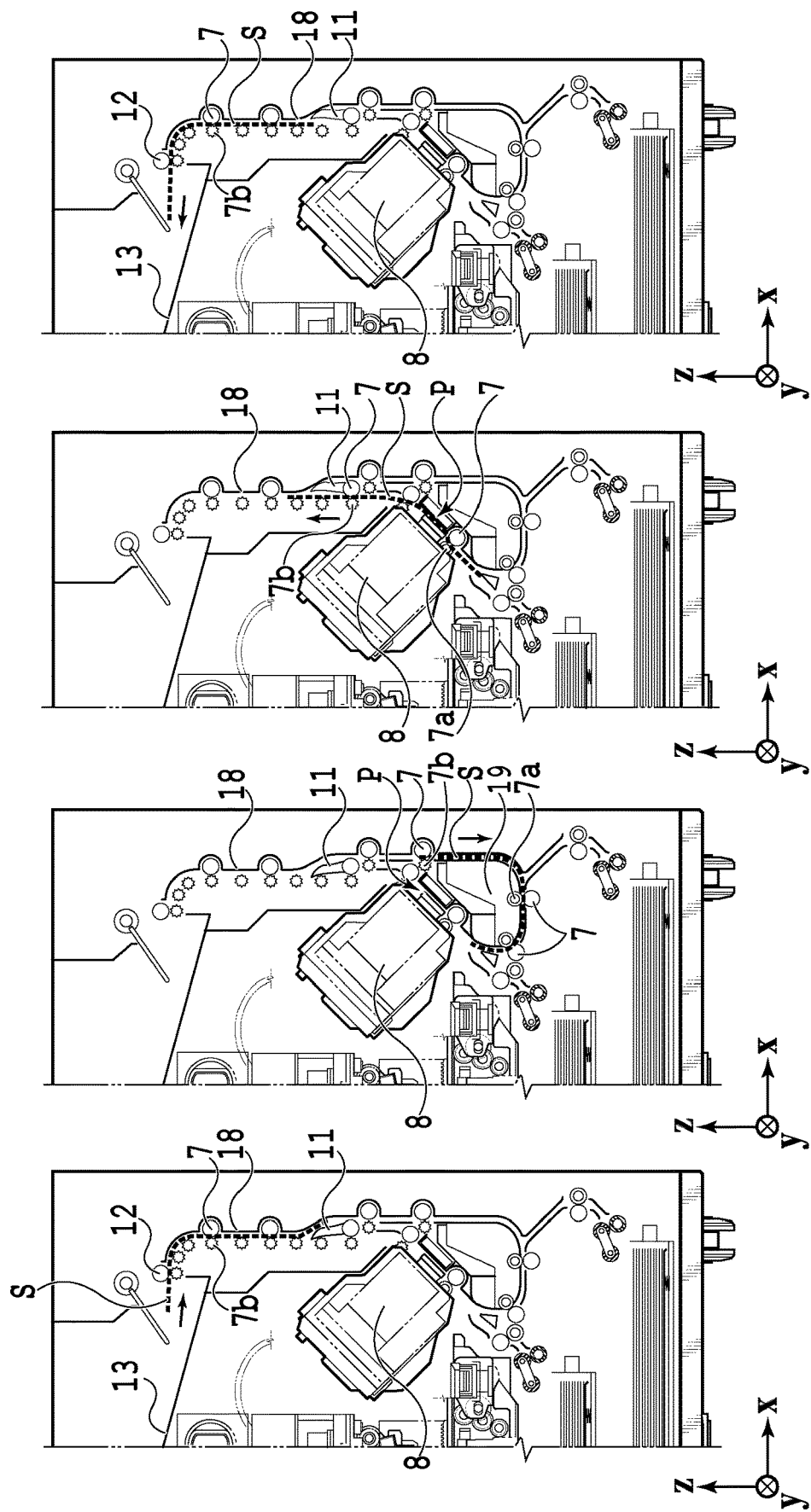

PRINTING APPARATUS WITH PLATEN MOVEABLE FOR JAM PROCESSING

BACKGROUND OF THE INVENTION

Field of the Invention

The present invention relates to printing apparatuses capable of performing a process for removing a jam (jam processing) of a print medium.

Description of the Related Art

U.S. Pat. No. 8,696,107 describes that in a case where a jam of a print medium occurs in a printing apparatus, in order to remove the jammed print medium, jam processing is to be performed after a user turns a platen so as to easily take out the print medium. However, an ordinary printing apparatus has a problem that even if a user attempts to access a platen in performing the jam processing, it is difficult for the user to identify the platen and thus the user takes longer time in the jam processing.

SUMMARY OF THE INVENTION

Accordingly, the present invention provides a printing apparatus capable of easily performing jam processing.

For that, a printing apparatus of the present invention includes: a printing device configured to perform printing on a print medium; and a platen provided facing the printing device in a print unit, where printing is to be performed, the platen supporting the print medium during printing, in which the platen can be located at a first position where the print medium during printing is supported and where the platen is supported by a supporting member which supports the platen against a turning force with which the platen turns, and at a second position turning from the first position and where a user can eliminate a jam of the print medium in the print unit. The printing apparatus further includes a locking unit configured to lock the platen, which will turn from the first position due to the turning force once the support by the supporting member is released, at a third position which is a position between the first position and the second position.

According to the present invention, a printing apparatus capable of easily performing jam processing can be realized.

Further features of the present invention will become apparent from the following description of exemplary embodiments with reference to the attached drawings.

BRIEF DESCRIPTION OF THE DRAWINGS

FIG. 4A illustrates a conveying path of a print medium fed from a first cassette;
FIG. 4B illustrates a conveying path of the print medium fed from the first cassette;
FIG. 4C illustrates a conveying path of the print medium fed from the first cassette;
FIG. 6A illustrates a conveying path when performing a print operation on the rear surface of a print medium;
FIG. 6B illustrates a conveying path when performing the print operation on the rear surface of the print medium;
FIG. 6C illustrates a conveying path when performing the print operation on the rear surface of the print medium;
FIG. 6D illustrates a conveying path when performing the print operation on the rear surface of the print medium.

DESCRIPTION OF THE EMBODIMENTS

Figure 1:
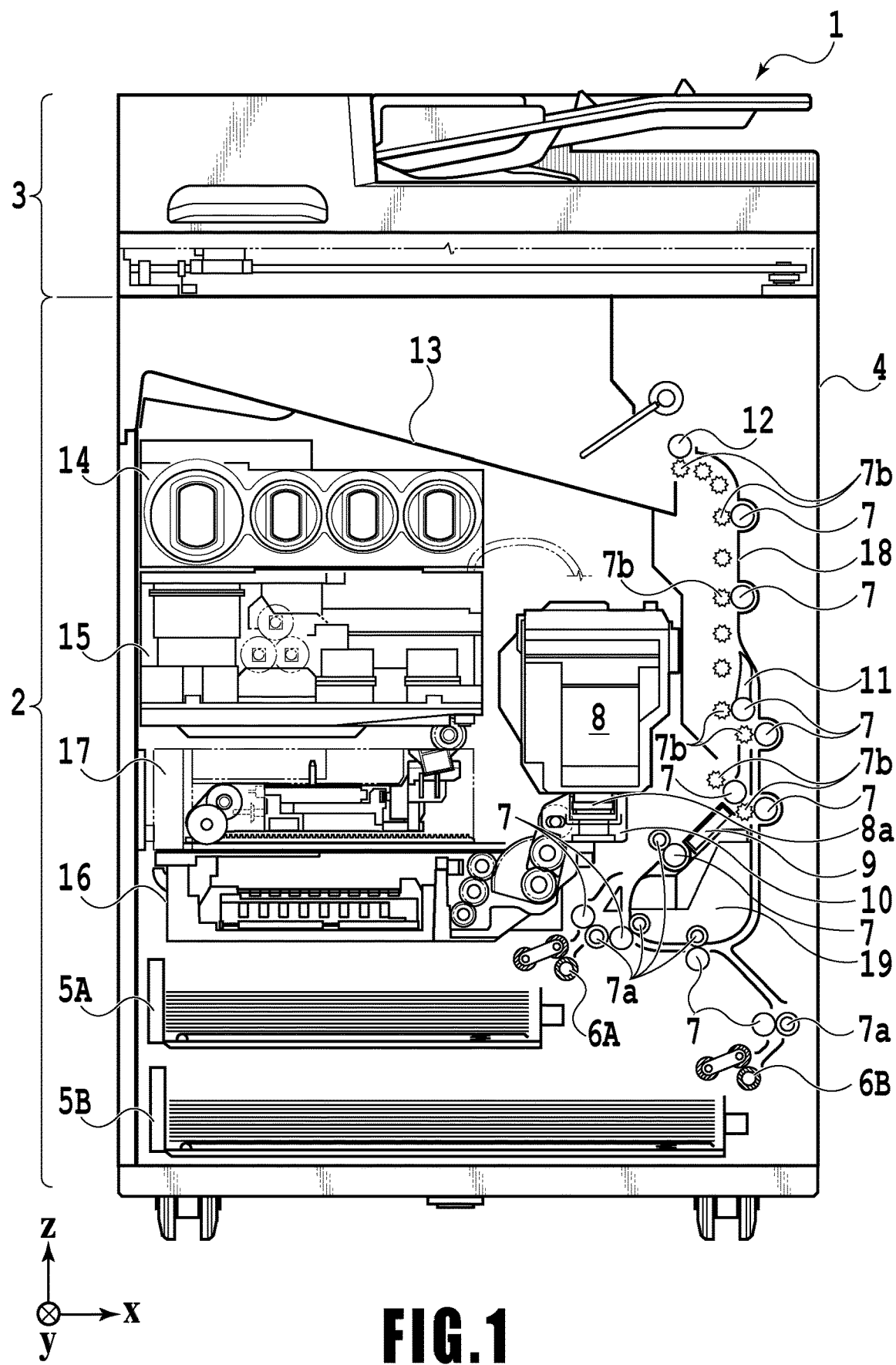
FIG. 1 illustrates a printing apparatus in a standby state.

Hereinafter, embodiments of the present invention will be described with reference to the accompanying drawings. FIG. 1 is an internal configuration diagram of an inkjet printing apparatus 1 (hereinafter "printing apparatus 1") used in the present embodiment. In the drawings, an x-direction is a horizontal direction, a y-direction (a direction perpendicular to paper) is a direction in which ejection openings are arrayed in a print head 8 described later, and a z-direction is a vertical direction. The printing apparatus 1 is a multifunction printer comprising a print unit 2 and a scanner unit 3. The printing apparatus 1 can use the print unit 2 and the scanner unit 3 separately or in synchronization to perform various processes related to print operation and scan operation. The scanner unit 3 comprises an automatic document feeder (ADF) and a flatbed scanner (FBS) and is capable of scanning a document automatically fed by the ADF as well as scanning a document placed by a user on a document plate of the FBS. The present embodiment is directed to the multifunction printer comprising both the print unit 2 and the scanner unit 3, but the scanner unit 3 may be omitted. FIG. 1 shows the printing apparatus 1 in a standby state in which neither print operation nor scan operation is performed.

In the print unit 2, a first cassette 5A and a second cassette 5B for housing printing media (cut sheets) S are detachably provided at the bottom of a casing 4 in the vertical direction. Relatively small printing media of up to A4 size are stacked and housed in the first cassette 5A and relatively large printing media of up to A3 size are stacked and housed in the second cassette 5B. A first feeding unit 6A for feeding housed printing media one by one is provided near the first cassette 5A. Similarly, a second feeding unit 6B is provided near the second cassette 5B. In print operation, a print medium S is selectively fed from either one of the cassettes.

Conveying rollers 7, a discharging roller 12, pinch rollers 7a, spurs 7b, a guide 18, an inner guide 19, and a flapper 11 are conveying mechanisms for guiding a print medium S in a predetermined direction. The conveying rollers 7 are drive rollers located upstream and downstream of the print head 8 and driven by a conveying motor (not shown). The pinch rollers 7a are follower rollers that are turned while nipping a print medium S together with the conveying rollers 7. The discharging roller 12 is a drive roller located downstream of the conveying rollers 7 and driven by the conveying motor (not shown). The spurs 7b nip and convey a print medium S together with the conveying rollers 7 and discharging roller 12 located downstream of the print head 8.

The printing apparatus 1 is provided with a plurality of motors for driving the above-described driving rollers, and each of the above-described driving rollers is connected to one of a plurality of motors. The correspondence between the motors and the driving rollers will be described in detail later.

The guide 18 is provided in a conveying path of a print medium S to guide the print medium S in a predetermined direction. The inner guide 19 is a member extending in the y-direction. The inner guide 19 has a curved side surface and guides a print medium S along the side surface. The flapper 11 is a member for changing a direction in which a print medium S is conveyed in duplex print operation. A discharging tray 13 is a tray for stacking and housing printing media S that were subjected to print operation and discharged by the discharging roller 12.

The print head 8 of the present embodiment is a full line type color inkjet print head. In the print head 8, a plurality of ejection openings configured to eject ink based on print data are arrayed in the y-direction in FIG. 1 so as to correspond to the width of a print medium S. That is, the print head is configured to eject inks of a plurality of colors. When the print head 8 is in a standby position, an ejection opening surface 8a of the print head 8 is oriented vertically downward and capped with a cap unit 10 as shown in FIG. 1. In print operation, the orientation of the print head 8 is changed by a print controller 202 (described later) such that the ejection opening surface 8a faces a platen 9. The platen 9 includes a flat plate extending in the y-direction and supports a print medium S being subjected to print operation by the print head 8 from the back side. The movement of the print head 8 from the standby position to a printing position will be described later in detail.

An ink tank unit 14 separately stores ink of four colors to be supplied to the print head 8. An ink supply unit 15 is provided in the midstream of a flow path connecting the ink tank unit 14 to the print head 8 to adjust the pressure and flow rate of ink in the print head 8 within a suitable range. The present embodiment adopts a circulation type ink supply system, where the ink supply unit 15 adjusts the pressure of ink supplied to the print head 8 and the flow rate of ink collected from the print head 8 within a suitable range.

A maintenance unit 16 comprises the cap unit 10 and a wiping unit 17 and activates them at predetermined timings to perform maintenance operation for the print head 8. The maintenance operation will be described later in detail.

Figure 2:
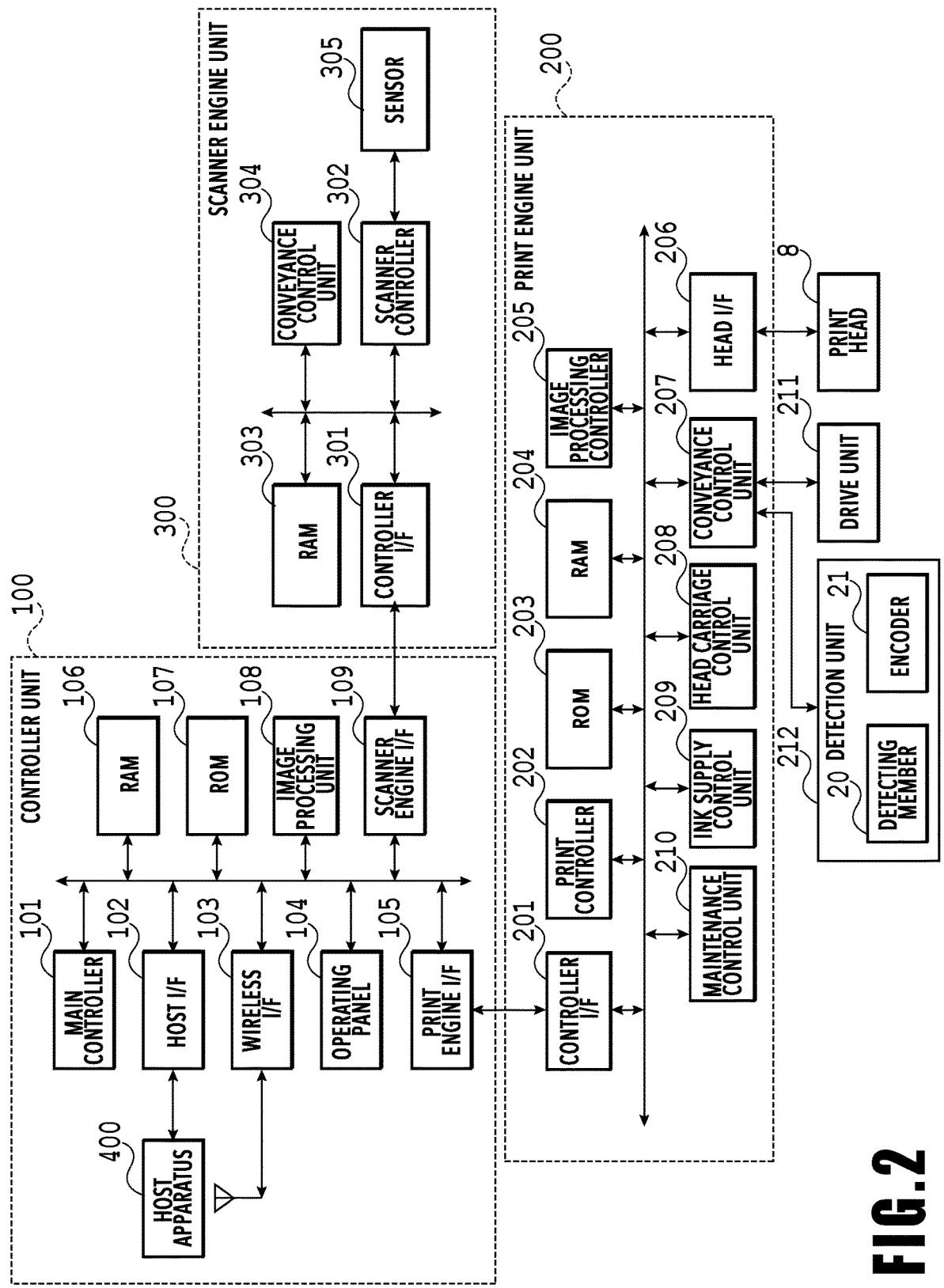
FIG. 2 is a control block diagram of the printing apparatus.

FIG. 2 is a block diagram showing a control configuration in the printing apparatus 1. The control configuration mainly includes a print engine unit 200 that exercises control over the print unit 2, a scanner engine unit 300 that exercises control over the scanner unit 3, and a controller unit 100 that exercises control over the entire printing apparatus 1. A print controller 202 controls various mechanisms of the print engine unit 200 under instructions from a main controller 101 of the controller unit 100. Various mechanisms of the scanner engine unit 300 are controlled by the main controller 101 of the controller unit 100. The control configuration will be described below in detail.

In the controller unit 100, the main controller 101 including a CPU controls the entire printing apparatus 1 using a RAM 106 as a work area in accordance with various parameters and programs stored in a ROM 107. For example, when a print job is input from a host apparatus 400 via a host I/F 102 or a wireless I/F 103, an image processing unit 108 executes predetermined image processing for received image data under instructions from the main controller 101. The main controller 101 transmits the image data subjected to the image processing to the print engine unit 200 via a print engine I/F 105.

The printing apparatus 1 may acquire image data from the host apparatus 400 via a wireless or wired communication or acquire image data from an external storage unit (such as a USB memory) connected to the printing apparatus 1. A communication system used for the wireless or wired communication is not limited. For example, as a communication system for the wireless communication, Wi-Fi (Wireless Fidelity; registered trademark) and Bluetooth (registered trademark) can be used. As a communication system for the wired communication, a USB (Universal Serial Bus) and the like can be used. For example, when a scan command is input from the host apparatus 400, the main controller 101 transmits the command to the scanner unit 3 via a scanner engine I/F 109.

An operating panel 104 is a mechanism to allow a user to do input and output for the printing apparatus 1. A user can give an instruction to perform operation such as copying and scanning, set a print mode, and recognize information about the printing apparatus 1 via the operating panel 104.

In the print engine unit 200, the print controller 202 including a CPU controls various mechanisms of the print unit 2 using a RAM 204 as a work area in accordance with various parameters and programs stored in a ROM 203. When various commands and image data are received via a controller I/F 201, the print controller 202 temporarily stores them in the RAM 204. The print controller 202 allows an image processing controller 205 to convert the stored image data into print data such that the print head 8 can use it for print operation. After the generation of the print data, the print controller 202 allows the print head 8 to perform print operation based on the print data via a head I/F 206. At this time, the print controller 202 conveys a print medium S by driving the feeding units 6A and 6B, conveying rollers 7, discharging roller 12, and flapper 11 shown in FIG. 1 via a conveyance control unit 207. The print head 8 performs print operation in synchronization with the conveyance operation of the print medium S under instructions from the print controller 202, thereby performing printing.

The conveyance control unit 207 is connected to a detection unit 212 configured to detect a conveying state of the print medium S, and to a drive unit 211 configured to drive a plurality of driving rollers, and controls, based on a detection result obtained from the detection unit 212, the conveyance of the print medium S using the drive unit 211. The detection unit 212 includes a detecting member 20 configured to detect the presence or absence of the print medium S, and an encoder 21 configured to detect the rotation amount of the driving roller.

In the course of the print medium S being conveyed by the conveyance control unit 207, under an instruction of the print controller 202, a print operation by the print head 8 is executed and the printing process is performed.

A head carriage control unit 208 changes the orientation and position of the print head 8 in accordance with an operating state of the printing apparatus 1 such as a maintenance state or a printing state. An ink supply control unit 209 controls the ink supply unit 15 such that the pressure of ink supplied to the print head 8 is within a suitable range. A maintenance control unit 210 controls the operation of the cap unit 10 and wiping unit 17 in the maintenance unit 16 when performing maintenance operation for the print head 8.

In the scanner engine unit 300, the main controller 101 controls hardware resources of the scanner controller 302 using the RAM 106 as a work area in accordance with various parameters and programs stored in the ROM 107, thereby controlling various mechanisms of the scanner unit 3. For example, the main controller 101 controls hardware resources in the scanner controller 302 via a controller I/F 301 to cause a conveyance control unit 304 to convey a document placed by a user on the ADF and cause a sensor 305 to scan the document. The scanner controller 302 stores scanned image data in a RAM 303. The print controller 202 can convert the image data acquired as described above into print data to enable the print head 8 to perform print operation based on the image data scanned by the scanner controller 302.

Figure 3:
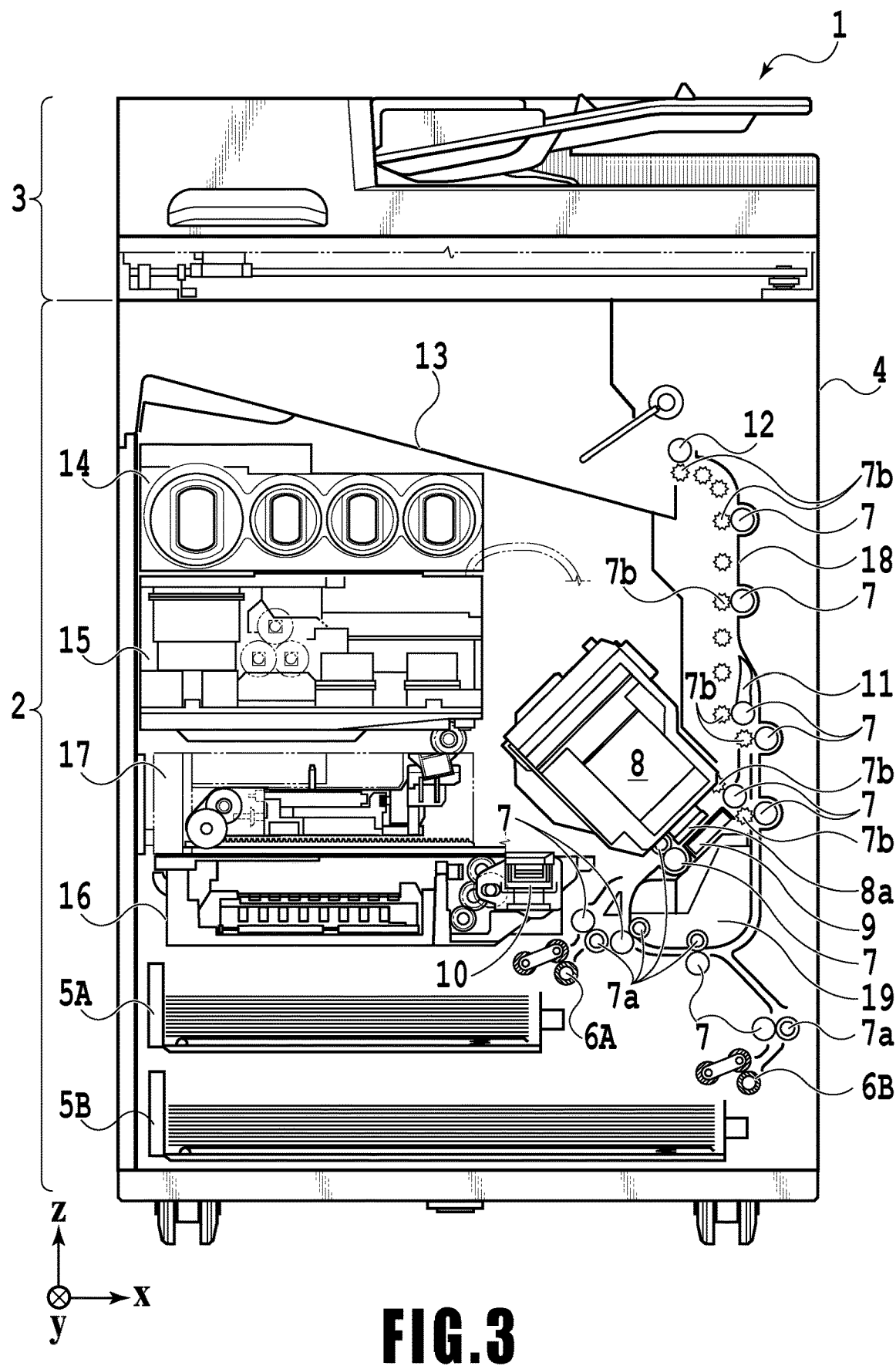
FIG. 3 illustrates the printing apparatus in a printing state.

FIG. 3 shows the printing apparatus 1 in a printing state. As compared with the standby state shown in FIG. 1, the cap unit 10 is separated from the ejection opening surface 8a of the print head 8 and the ejection opening surface 8a faces the platen 9. In the present embodiment, the plane of the platen 9 is inclined about 45° with respect to the horizontal plane. The ejection opening surface 8a of the print head 8 in a printing position is also inclined about 45° with respect to the horizontal plane so as to keep a constant distance from the platen 9.

In the case of moving the print head 8 from the standby position shown in FIG. 1 to the printing position shown in FIG. 3, the print controller 202 uses the maintenance control unit 210 to move the cap unit 10 down to an evacuation position shown in FIG. 3, thereby separating the cap member 10a from the ejection opening surface 8a of the print head 8. The print controller 202 then uses the head carriage control unit 208 to turn the print head 8 45° while adjusting the vertical height of the print head 8 such that the ejection opening surface 8a faces the platen 9. After the completion of print operation, the print controller 202 reverses the above procedure to move the print head 8 from the printing position to the standby position.

Next, a conveying path of a print medium S in the print unit 2 will be described. When a print command is input, the print controller 202 first uses the maintenance control unit 210 and the head carriage control unit 208 to move the print head 8 to the printing position shown in FIG. 3. The print controller 202 then uses the conveyance control unit 207 to drive either the first feeding unit 6A or the second feeding unit 6B in accordance with the print command and feed a print medium S.

FIG. 4A to FIG. 4C are diagrams showing a conveying path in the case of feeding an A4 size print medium S from the first cassette 5A. A print medium S at the top of a stack of printing medium in the first cassette 5A is separated from the rest of the stack by the first feeding unit 6A and conveyed toward a print area P between the platen 9 and the print head 8 while being nipped between the conveying rollers 7 and the pinch rollers 7a. FIG. 4A shows a conveying state where the front end of the print medium S is about to reach the print area P. The direction of movement of the print medium S is changed from the horizontal direction (x-direction) to a direction inclined about 45° with respect to the horizontal direction while being fed by the first feeding unit 6A to reach the print area P.

In the print area P, a plurality of ejection openings provided in the print head 8 eject ink toward the print medium S. In an area where ink is applied to the print medium S, the back side of the print medium S is supported by the platen 9 so as to keep a constant distance between the ejection opening surface 8a and the print medium S. After ink is applied to the print medium S, the conveying rollers 7 and the spurs 7b guide the print medium S such that the print medium S passes on the left of the flapper 11 with its tip inclined to the right and is conveyed along the guide 18 in the vertically upward direction of the printing apparatus 1. FIG. 4B shows a state where the front end of the print medium S has passed through the print area P and the print medium S is being conveyed vertically upward. The conveying rollers 7 and the spurs 7b change the direction of movement of the print medium S from the direction inclined about 45° with respect to the horizontal direction in the print area P to the vertically upward direction.

After being conveyed vertically upward, the print medium S is discharged into the discharging tray 13 by the discharging roller 12 and the spurs 7b. FIG. 4C shows a state where the front end of the print medium S has passed through the discharging roller 12 and the print medium S is being discharged into the discharging tray 13. The discharged print medium S is held in the discharging tray 13 with the side on which an image was printed by the print head 8 down.

Figure 5C:
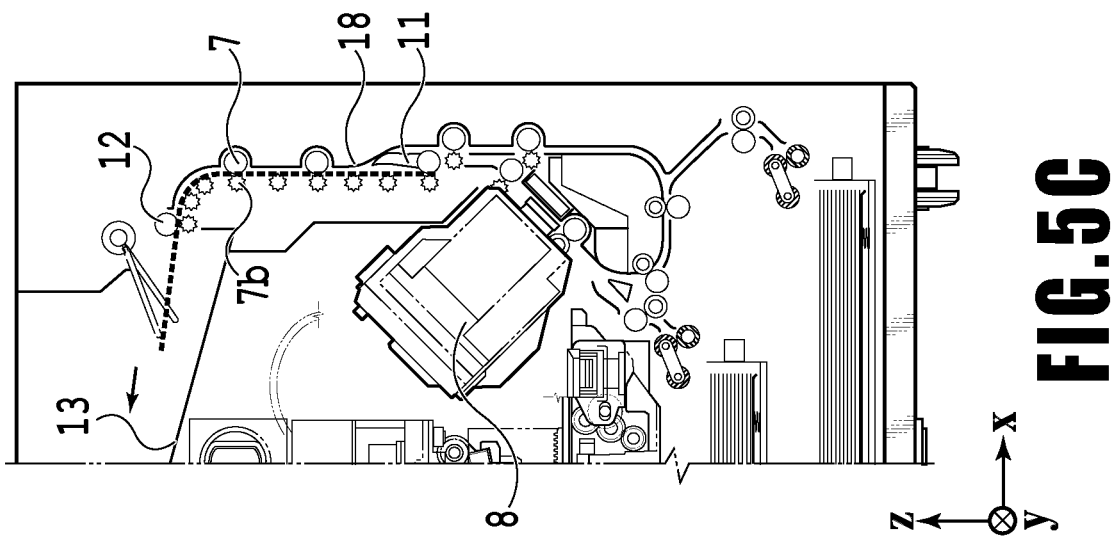
FIG. 5C illustrates a conveying path of the print medium fed from the second cassette.
Figure 5B:
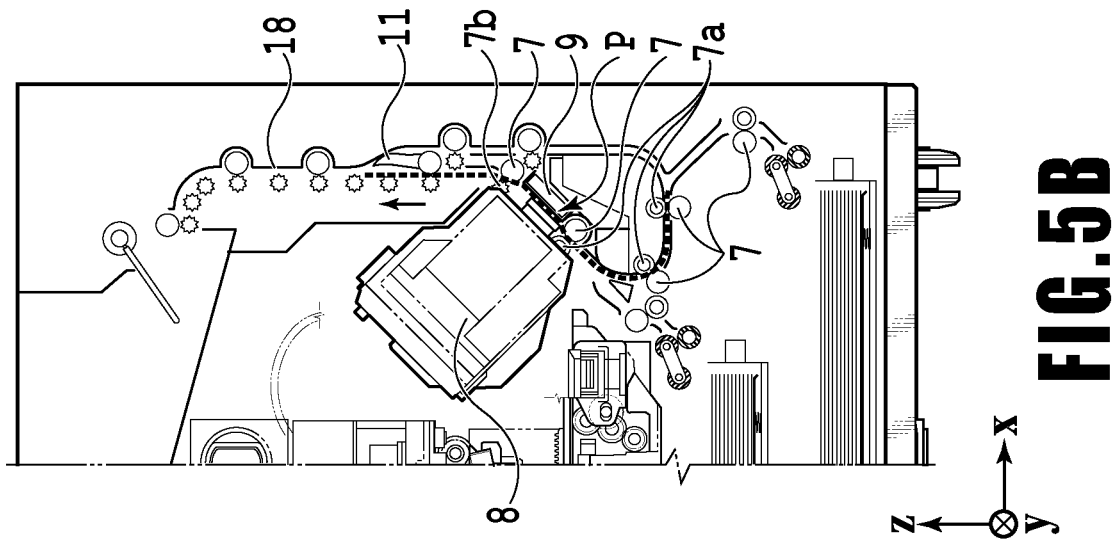
FIG. 5B illustrates a conveying path of the print medium fed from the second cassette.
Figure 5A:
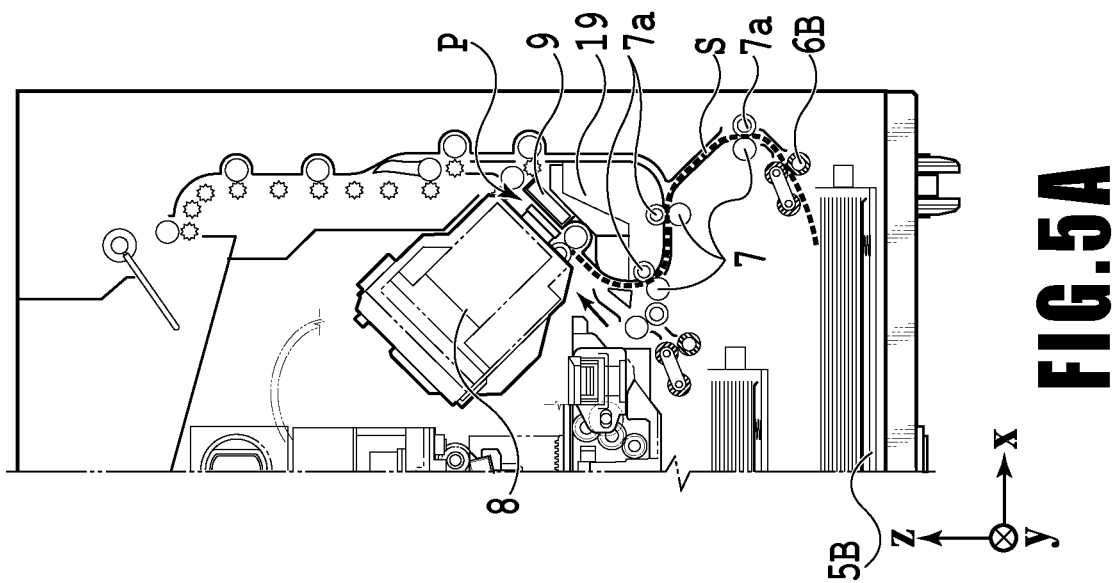
FIG. 5A illustrates a conveying path of a print medium fed from a second cassette.

FIG. 5A to FIG. 5C are diagrams showing a conveying path in the case of feeding an A3 size print medium S from the second cassette 5B. A print medium S at the top of a stack of printing medium in the second cassette 5B is separated from the rest of the stack by the second feeding unit 6B and conveyed toward the print area P between the platen 9 and the print head 8 while being nipped between the conveying rollers 7 and the pinch rollers 7a.

FIG. 5A shows a conveying state where the front end of the print medium S is about to reach the print area P. In a part of the conveying path, through which the print medium S is fed by the second feeding unit 6B toward the print area P, the plurality of conveying rollers 7, the plurality of pinch rollers 7a, and the inner guide 19 are provided such that the print medium S is conveyed to the platen 9 while being bent into an S-shape.

The rest of the conveying path is the same as that in the case of the A4 size print medium S shown in FIG. 4B and FIG. 4C. FIG. 5B shows a state where the front end of the print medium S has passed through the print area P and the print medium S is being conveyed vertically upward. FIG. 5C shows a state where the front end of the print medium S has passed through the discharging roller 12 and the print medium S is being discharged into the discharging tray 13.

FIG. 6A to FIG. 6D show a conveying path in the case of performing print operation (duplex printing) for the back side (second side) of an A4 size print medium S. In the case of duplex printing, print operation is first performed for the first side (front side) and then performed for the second side (back side). A conveying procedure during print operation for the first side is the same as that shown in FIG. 4A to FIG. 4C and therefore description will be omitted. A conveying procedure subsequent to FIG. 4C will be described below.

After the print head 8 finishes print operation for the first side and the back end of the print medium S passes by the flapper 11, the print controller 202 turns the conveying rollers 7 backward to convey the print medium S into the printing apparatus 1. At this time, since the flapper 11 is controlled by an actuator (not shown) such that the tip of the flapper 11 is inclined to the left, the front end of the print medium S (corresponding to the back end during the print operation for the first side) passes on the right of the flapper 11 and is conveyed vertically downward. FIG. 6A shows a state where the front end of the print medium S (corresponding to the back end during the print operation for the first side) is passing on the right of the flapper 11.

Then, the print medium S is conveyed along the curved outer surface of the inner guide 19 and then conveyed again to the print area P between the print head 8 and the platen 9. At this time, the second side of the print medium S faces the ejection opening surface 8*a* of the print head 8. FIG. 6B shows a conveying state where the front end of the print medium S is about to reach the print area P for print operation for the second side.

The rest of the conveying path is the same as that in the case of the print operation for the first side shown in FIG. 4B and FIG. 4C. FIG. 6C shows a state where the front end of the print medium S has passed through the print area P and the print medium S is being conveyed vertically upward. At this time, the flapper 11 is controlled by the actuator (not shown) such that the tip of the flapper 11 is inclined to the right. FIG. 6D shows a state where the front end of the print medium S has passed through the discharging roller 12 and the print medium S is being discharged into the discharging tray 13.

Next, maintenance operation for the print head 8 will be described. As described with reference to FIG. 1, the maintenance unit 16 of the present embodiment comprises the cap unit 10 and the wiping unit 17 and activates them at predetermined timings to perform maintenance operation.

Figure 7:
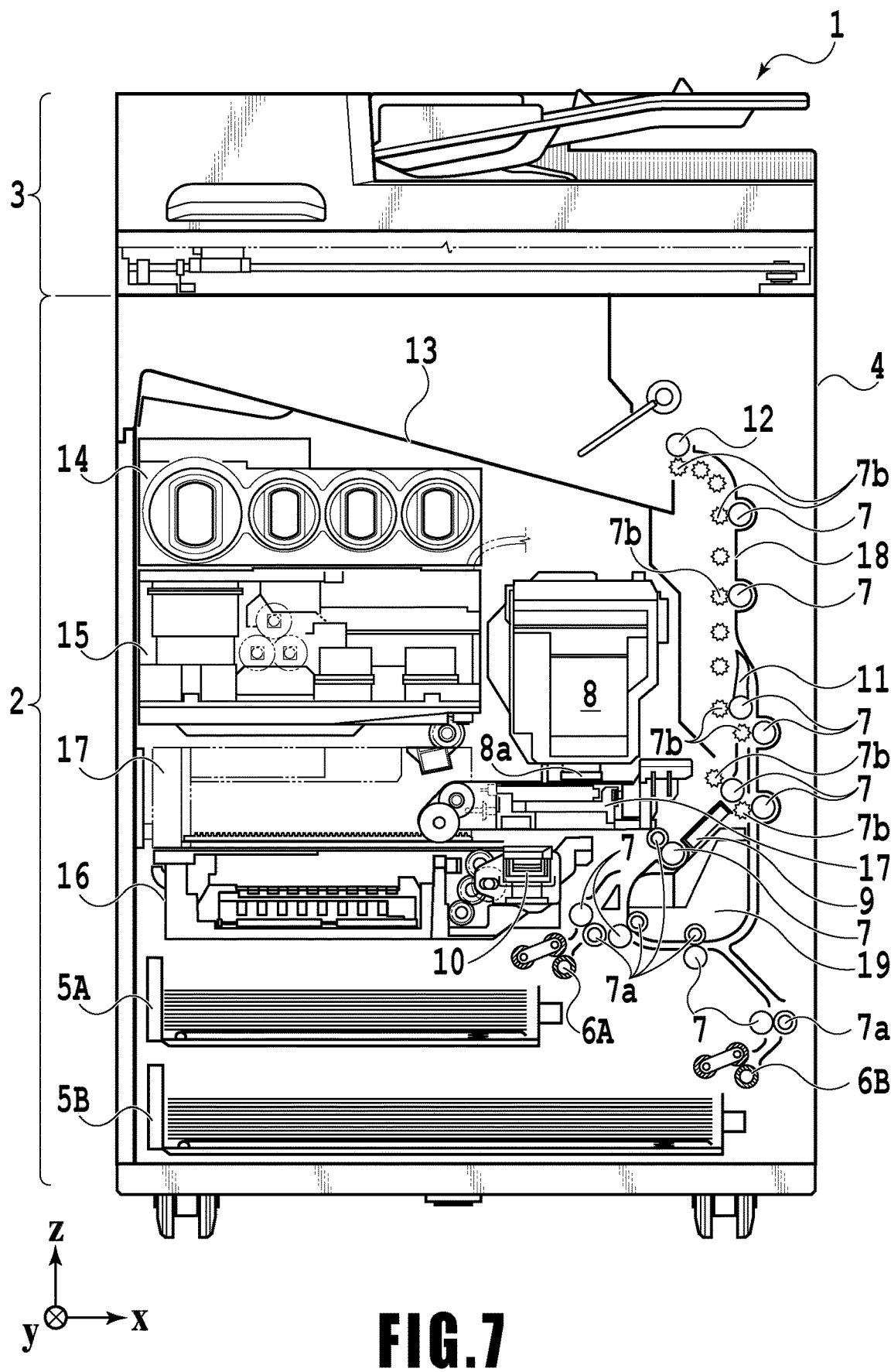
FIG. 7 illustrates the printing apparatus in a maintenance state.

FIG. 7 is a diagram showing the printing apparatus 1 in a maintenance state. In the case of moving the print head 8 from the standby position shown in FIG. 1 to a maintenance position shown in FIG. 7, the print controller 202 moves the print head 8 vertically upward and moves the cap unit 10 vertically downward. The print controller 202 then moves the wiping unit 17 from the evacuation position to the right in FIG. 7. After that, the print controller 202 moves the print head 8 vertically downward to the maintenance position where maintenance operation can be performed.

On the other hand, in the case of moving the print head 8 from the printing position shown in FIG. 3 to the maintenance position shown in FIG. 7, the print controller 202 moves the print head 8 vertically upward while turning it 45°. The print controller 202 then moves the wiping unit 17 from the evacuation position to the right. Following that, the print controller 202 moves the print head 8 vertically downward to the maintenance position where maintenance operation can be performed.

Figure 8:
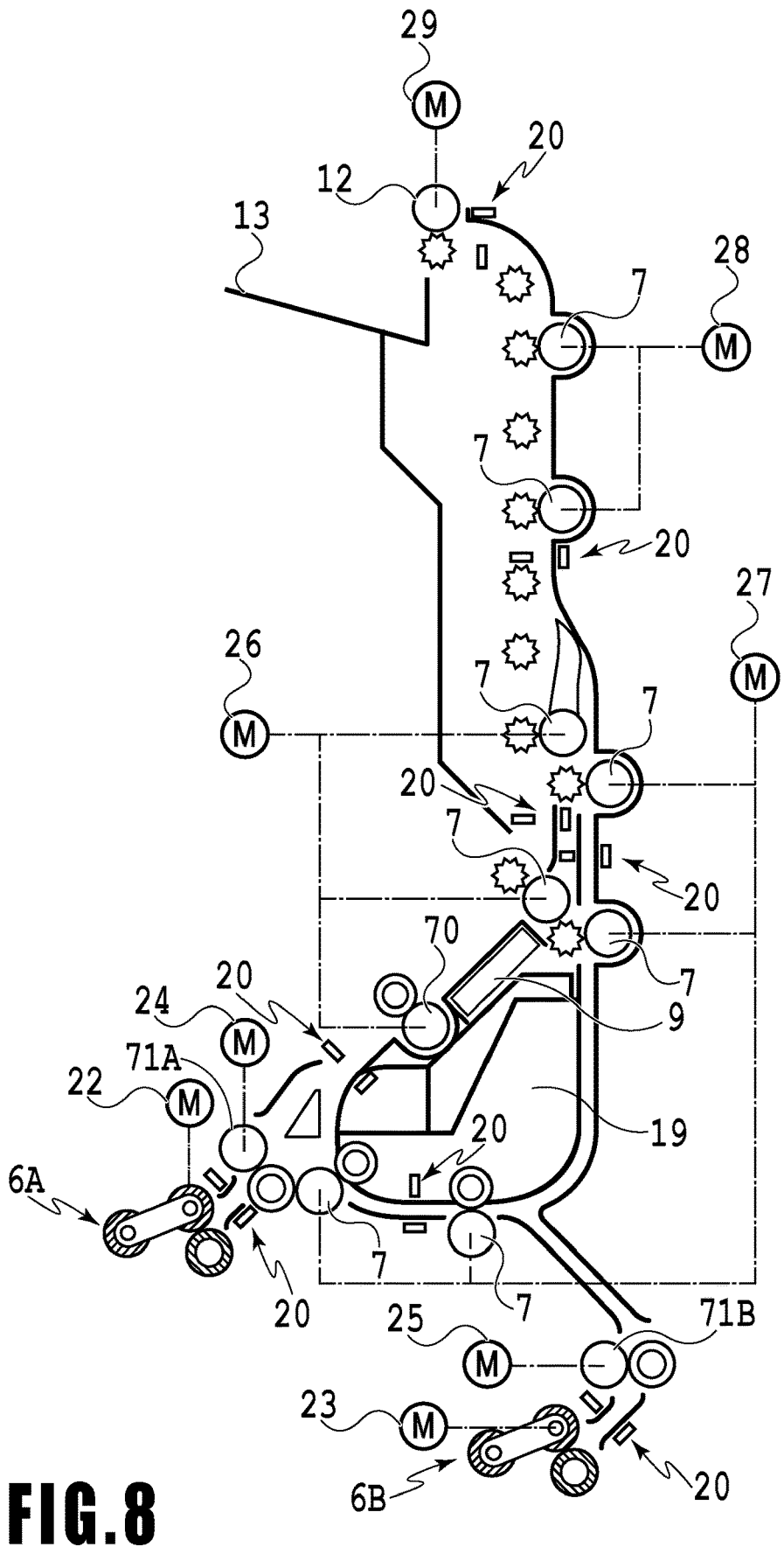
FIG. 8 illustrates a correspondence between a driving roller and a motor.

FIG. 8 illustrates a correspondence between a plurality of motors and a plurality of driving rollers in the printing apparatus 1. A first feeding motor 22 drives the first feeding unit 6A for feeding the print medium S from the first cassette 5A. A second feeding motor 23 drives the second feeding unit 6B for feeding the print medium S from the second cassette 5B. A first conveying motor 24 drives a first intermediate roller 71A which firstly conveys the print medium S fed by the first feeding unit 6A. A second conveying motor 25 drives a second intermediate roller 71B which firstly conveys the print medium S fed by the second feeding unit 6B.

A main conveying motor 26 drives a main conveying roller 70 which is arranged on the upstream side of the platen 9 and which drives mainly the print medium S during printing. Moreover, the main conveying motor 26 drives two conveying rollers 7 which are arranged on the downstream side of the platen 9 and which convey, further to the downstream side, the print medium S conveyed by the main conveying roller 70.

A third conveying motor 27 drives two conveying rollers 7 which convey downward the print medium S whose first surface has been printed. Moreover, the third conveying motor 27 drives two conveying rollers 7 which are arranged along the inner guide 19 and which convey, toward the print head 8, a print medium fed from the second cassette 5B and conveyed by the second intermediate roller 71B or a print medium whose first surface has been printed and then whose front and rear surfaces have been flipped.

A fourth conveying motor 28 drives two conveying rollers 7 which convey upward or downward the printing medium S after being subjected to a print operation. A discharging motor 29 drives the discharging roller 12 which discharges to the discharging tray 13 the print medium S after being subjected to the print operation. In this manner, each of two feeding motors 22, 23, five conveying motors 24 to 28, and the discharging motor 29 is associated with one or more driving rollers.

On the other hand, at eight places along the conveying path, the detecting member 20 for detecting the presence or absence of the print medium S is arranged. Each detecting member 20 includes a sensor and mirror arranged across the conveying path, in which the sensor including a light emission section and light receiving section is arranged on one side of the conveying path, while the mirror is arranged on the other side of the conveying path at a position facing the sensor. Depending on whether or not the light receiving section has detected the light emitted from the light emission section of the sensor and reflected by the mirror, the presence or absence of the print medium S, i.e., whether or not a tip or rear end thereof has passed therethrough, is determined.

Based on each of detection results of a plurality of detecting members 20 and on an output value of the encoder which detects the rotation amount of each driving roller, the conveyance control unit 207 individually drives the feeding motors 22, 23, conveying motors 24 to 28, and the discharging motor 29 to control the conveyance of the apparatus as a whole.

Hereinafter, the characteristic items of the present invention will be described.

FIG. 9A to FIG. 9E are outline views illustrating the printing apparatus 1, to which the present invention can be applicable, and illustrate an operating procedure during jam processing (process for eliminating the jam of a print medium). Once the jam of a print medium S occurs in the printing apparatus 1 during printing, then the occurrence of the jam is indicated on an operation panel, and a warning is displayed so as to urge to perform the jam processing (see FIG. 9A). Although the processing differs depending on the place where the jam has occurred, here the procedure of jam processing in the print area P (see FIG. 4A) will be described.

Figure 9A:
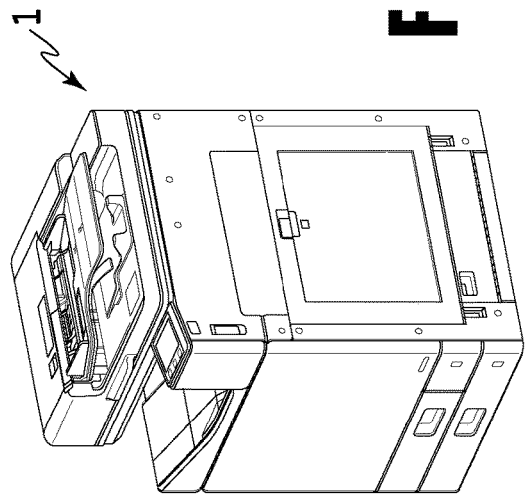
FIG. 9A illustrates an operating procedure during jam processing.
Figure 9B:
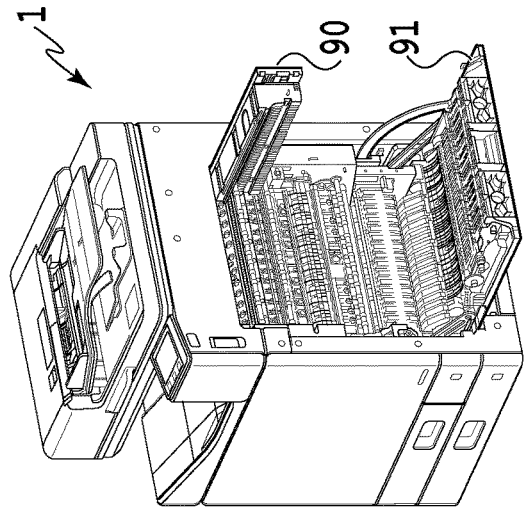
FIG. 9B illustrates an operating procedure during jam processing.

Once the jam of the print medium S occurs during printing and a warning for jam processing is displayed, then a user opens jam processing covers 90, 91, which are provided on a side surface of the printing apparatus 1, to access the place (print area P) where the jam has occurred (see FIG. 9B). The jam processing covers 90, 91 are configured so as to be opened, respectively, by pushing a button provided on a side surface of the printing apparatus 1. Then, once a user manually opens a platen supporting member (supporting member) 92 which supports the platen 9, then the access to the platen 9 from the outside is allowed (see FIG. 9C).

However, because the platen 9 is a relatively small member and many members are arranged adjacent thereto, it is difficult to identify which is the platen 9 and thus a user will take extra time to determine which member is to be moved next.

Figure 9E:
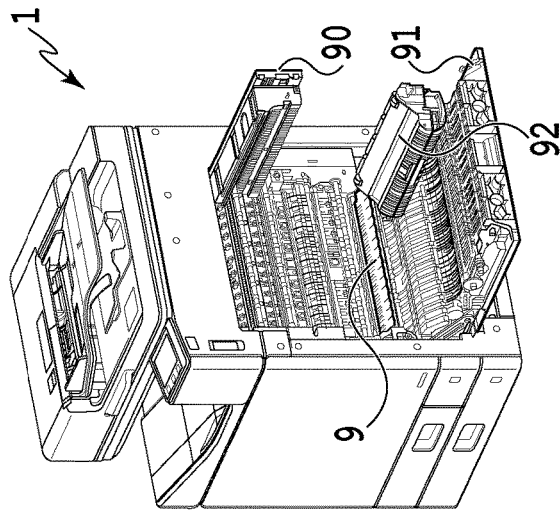
FIG. 9E illustrates an operating procedure during jam processing.
Figure 9D:
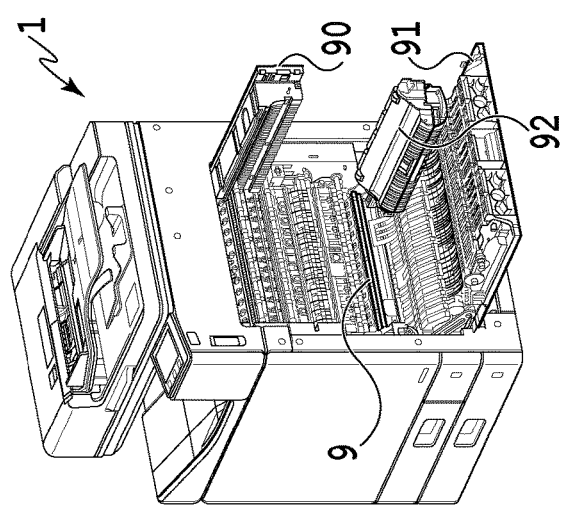
FIG. 9D illustrates an operating procedure during jam processing.
Figure 9C:
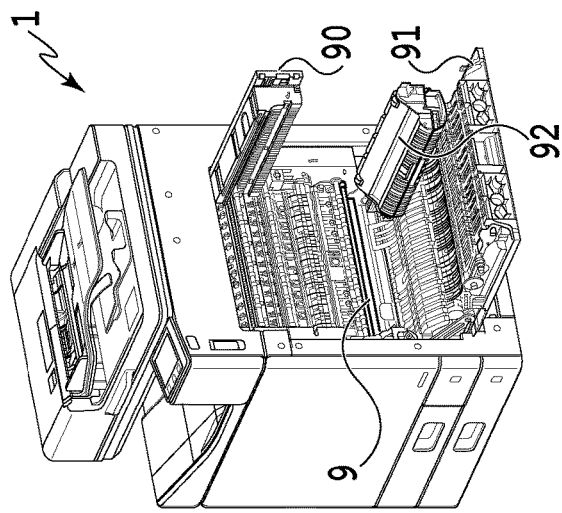
FIG. 9C illustrates an operating procedure during jam processing.

Then, in the printing apparatus 1 of this embodiment, the platen 9 is configured as followed: once a user manually opens the platen supporting member 92, then the support with respect to the platen 9 is released, and the platen 9 automatically turns from the first position to the third position at a predetermined angle and is locked there (see FIG. 9D). The support of the platen supporting member 92 is released and the platen 9 automatically turns to the predetermined angle in this manner, so that a user can recognize which member is the platen 9, and can easily understand which member is to be moved next. Thus, a user can perform the jam processing in a short time.

Once the platen 9 automatically turns and opens to the predetermined angle, then a user further manually turns the platen 9 against the force with which the platen 9 is locked, to turn the platen 9 to the second position at a jam processing angle at which the jam processing can be easily performed (see FIG. 9E). In this state, the print area P becomes sufficiently exposed for performing the jam processing, and thus a user can easily perform the jam processing in the print area P.

Figure 10A:
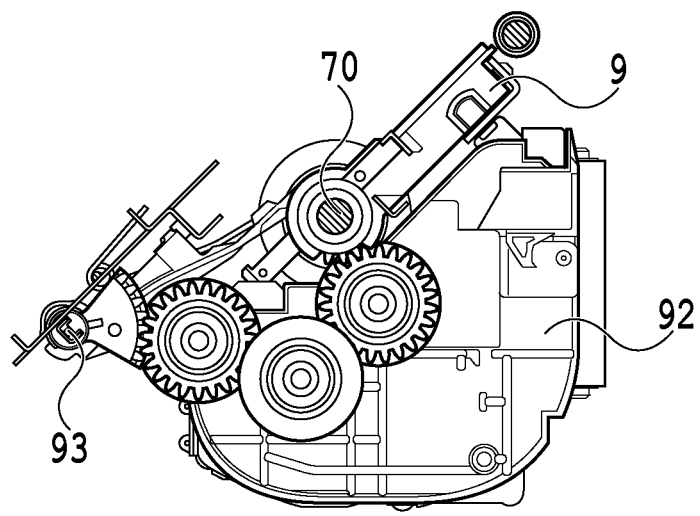
FIG. 10A illustrates a state of a platen during the jam processing in a print area.
Figure 10B:
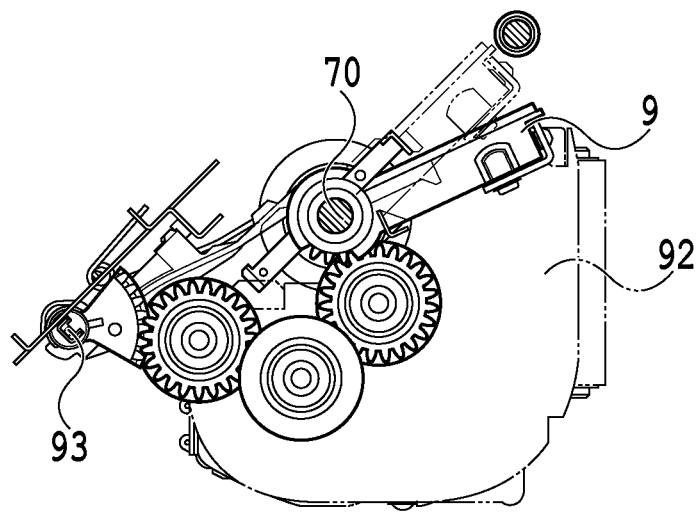
FIG. 10B illustrates a state of a platen during the jam processing in a print area.
Figure 10C:
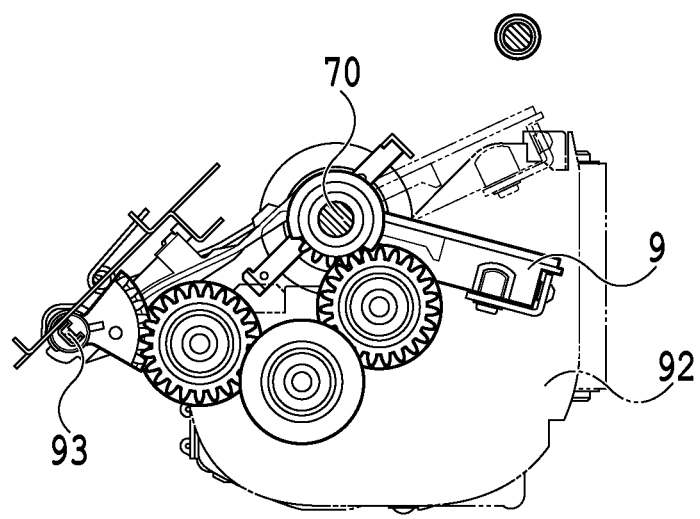
FIG. 10C illustrates a state of a platen during the jam processing in a print area.

FIG. 10A to FIG. 10C illustrate the states of the platen 9 during the jam processing in the print area P. The platen 9 turns, along with a turning force, about an axis coaxially with the axis of the main conveying roller 70, but in FIG. 10A the platen supporting member 92 is not yet opened and thus the platen 9 is supported by the platen supporting member 92 against the turning force. In this state, the print medium S during conveyance is nipped by the main conveying roller 70 and the driven roller, and thus the conveyance by the main conveying roller 70 is allowed. The position of the platen 9 in this state is referred to as the first position.

Then, once jam occurs in the print area P, the jam processing is started in the above-described procedure, and once the platen supporting member 92 is opened by a user, as illustrated in FIG. 10B, the platen 9 automatically turns due to the turning force, and is locked by a locking unit at the position of a predetermined angle. Even in this state, the print medium S is nipped by the main conveying roller 70 and the driven roller, and thus has not become a state where the jam processing can be performed. The position of the platen 9 in this state is referred to as the third position.

The platen 9 is configured to be able to turn further from the third position, and a user manually opens the platen 9 which has turned to the third position, against the force with which the platen 9 is locked, as illustrated in FIG. 10B, to a jam processing angle. Interlocked with the operation of opening the platen 9 to the jam processing angle, the nip to the print medium S by the main conveying roller 70 and the driven roller is released (the print medium is released), resulting in a state where the jam processing in the print area P is allowed. The position of the platen 9 in this state is referred to as the second position.

The print medium S is conveyed along the first position of the platen 9 which is inclined by 45 degrees relative to the horizontal direction. In contrast, at the second position of the platen 9 in performing the jam processing, the platen 9 is opened to the jam processing angle which has significantly turned from the first position. As the result, advantageously, the visibility during the jam processing in the print area P is excellent, the work area in the jam processing can be expanded, and the jam processing work can be facilitated.

In this manner, the platen 9 in the printing apparatus 1 of this embodiment can be located at three different positions: the first position where the platen 9 is pressed by the platen supporting member 92; the second position where the platen 9 is opened to the jam processing angle; and the third position which is a position between the first position and the second position.

Figure 11A:
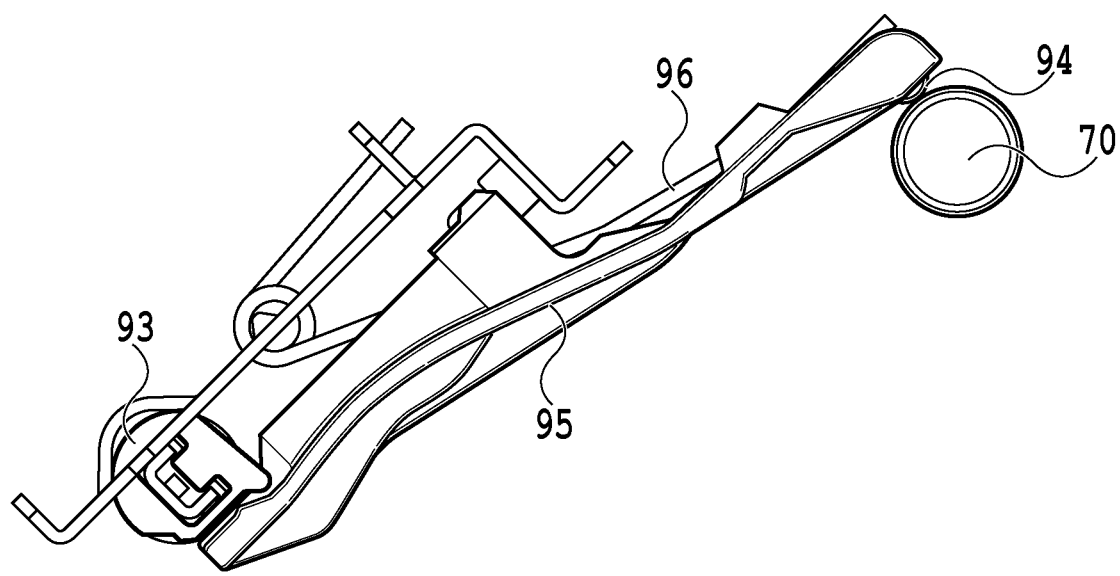
FIG. 11A illustrates a nip releasing unit.
Figure 11B:
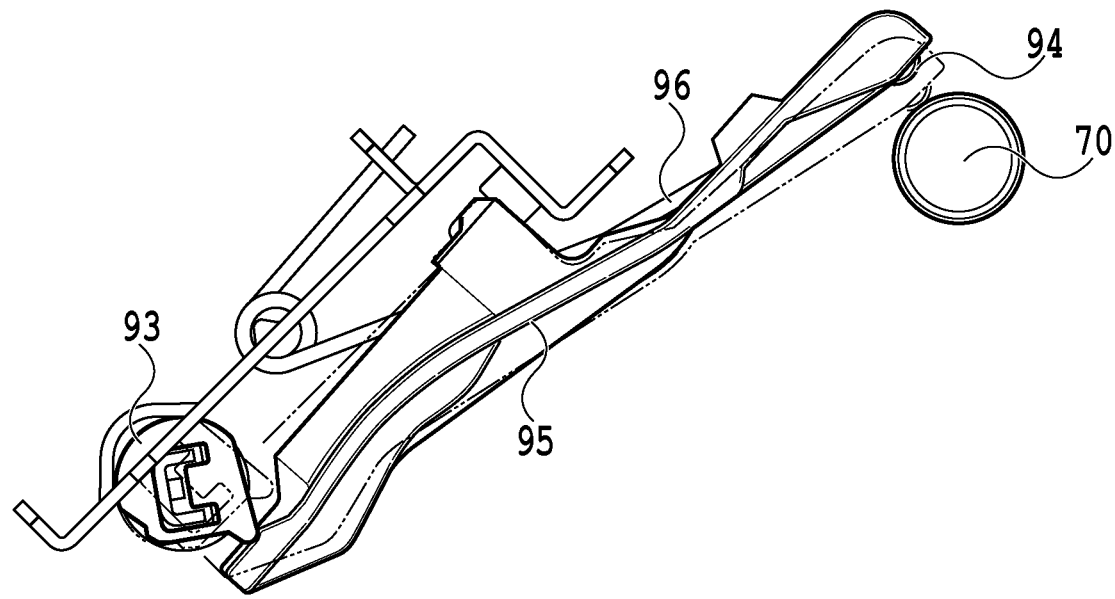
FIG. 11B illustrates a nip releasing unit.

FIG. 11A and FIG. 11B illustrate a nip releasing (pinch releasing) unit 93. The printing apparatus 1 includes the nip releasing unit 93, which performs, interlocked with turning of the platen 9, a nip operation and/or nip release operation with respect to the print medium S. The nip releasing unit 93 is interlinked with, via a plurality of gears, a gear which uses a turning shaft of the platen 9 as a rotating shaft (see FIG. 10A to FIG. 10C), and can interlock with the platen 9. FIG. 11A illustrates a state where the print medium S is nipped by the main conveying roller 70 and driven roller 94, which is the state when the platen 9 is located at the first position and the third position. The nip releasing unit 93 is in a nipping state, and a driven roller supporting member 95 provided with the driven roller 94 is biased by a spring 96, so that the driven roller 94 is biased with respect to the main conveying roller 70 to nip the print medium S.

FIG. 11B illustrates a state where the nipping has been released, which is the state when the platen 9 is located at the second position. Once the platen 9 is manually turned from the third position to the second position, then interlocked with this operation, the nip releasing unit 93 turns to press an end portion of the driven roller supporting member 95, so that the main conveying roller 70 and the driven roller 94 are spaced apart from each other, resulting in a release of nipping. In this manner, once the platen 9 is located at the second position and the nipping is released, then the jam processing in the print area P is allowed.

In this manner, once the support by the platen supporting member 92 is released, then the platen 9 automatically turns to the predetermined angle. Thus, a printing apparatus capable of easily performing jam processing can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-244268, filed Dec. 20, 2017, which is hereby incorporated by reference herein in its entirety.

What is claimed is:
1. A printing apparatus comprising:
 a convey unit configured to pinch and convey a print medium;
 a printing head configured to perform printing on the print medium conveyed by the convey unit;
 a platen which supports the print medium in facing the printing head, wherein the platen is rotatable between a first position to support the print medium during printing and a second position not to support the print medium;
 a supporting member that moves between a support position that supports the platen at the first position and a release position that does not support the platen;
 a locking unit configured to lock the platen, which rotates from the first postion due to a turning force once support by the supporting member is released, at a third position between the first position and the second position; and a pinching control unit configured to control pinching of the print medium by the convey unit, wherein when the platen is in the first position and the third position, the convey unit pinches the print medium by the control of the pinching control unit, when the platen moves from the third position to the second position, the pinching of the printing medium by the convey unit is released by the pinching control unit.

2. The printing apparatus according to claim 1, wherein the print medium is pinched, at the first position and at the third position, by a conveying roller which conveys the print medium by rotating and a driven roller which rotates following the conveying roller, and while at the second position, the print medium is released from the pinching by the conveying roller and the driven roller by the control of the pinching control unit.

3. The printing apparatus according to claim 2, wherein along with turning of the platen from the third position to the second position, the print medium is released from the pinching by the conveying roller and the driven roller by the control of the pinching control unit.

4. The printing apparatus according to claim 2, wherein the pinching control unit releases the pinching of the print medium by the conveying roller and the driven roller, and wherein the print medium is released from the pinching by turning of the platen being transferred to the pinching control unit by a gear.

5. The printing apparatus according to claim 2, wherein a rotating shaft of the conveying roller and a turning shaft of the platen are coaxial.

6. The printing apparatus according to claim 1, wherein the platen is capable of turning, by a manual operation of a user, from the third position to the second position against a force for locking the platen at the third position.

7. The printing apparatus according to claim 1, wherein a face of the platen for supporting the print medium is inclined at the first position.

8. The printing apparatus according to claim 7, wherein the print medium during printing is conveyed with the face of the platen inclined from a lower side to an upper side.

9. A printing apparatus comprising:

a convey unit configured to pinch and convey a print medium;

a printing head configured to perform printing on the print medium conveyed by the convey unit;

a platen which supports the print medium in facing the printing head, wherein the platen is rotatable between a first position to support the print medium during printing and a second position different from the first position, a locking unit configured to lock the platen at third position between the first position and the second position; and a pinching control unit configured to control pinching of the print medium by the convey unit, wherein when the platen is in the first position and the third position, the convey unit pinches the print medium by the control of the pinching control unit, and when the platen moves from the third position to the second position, the pinching of the printing medium by the convey unit is released by the pinching control unit.

* * * * *